US011340783B2

(12) United States Patent
Kildevaeld

(10) Patent No.: US 11,340,783 B2
(45) Date of Patent: May 24, 2022

(54) VIRTUAL SMART PHONE

(71) Applicant: KCG Technologies LLC, Boston, MA (US)

(72) Inventor: Michael Kildevaeld, Yarmouth Port, MA (US)

(73) Assignee: KCG Technologies LLC, Boston, MA (US)

( * ) Notice: Subject to any disclaimer, the term of this patent is extended or adjusted under 35 U.S.C. 154(b) by 0 days.

(21) Appl. No.: 17/201,173

(22) Filed: Mar. 15, 2021

(65) Prior Publication Data

US 2022/0004314 A1 Jan. 6, 2022

Related U.S. Application Data

(63) Continuation of application No. 16/513,256, filed on Jul. 16, 2019, now Pat. No. 10,976,926, which is a
(Continued)

(51) Int. Cl.
*G06F 3/04886* (2022.01)
*G06F 3/0488* (2022.01)
(Continued)

(52) U.S. Cl.
CPC ........ *G06F 3/04886* (2013.01); *G06F 3/0488* (2013.01); *H04M 1/6083* (2013.01); *H04M 1/72409* (2021.01); *H04M 1/72412* (2021.01)

(58) Field of Classification Search
CPC .... G06F 3/048; G06F 3/0488; G06F 3/04886; H04M 1/72409; H04M 1/72412; H04M 1/6083
(Continued)

(56) References Cited

U.S. PATENT DOCUMENTS 6,073,036 A 6/2000 Heikkinen
6,118,860 A 9/2000 Hillson et al.
(Continued)

FOREIGN PATENT DOCUMENTS

WO WO2008079889 7/2008
WO WO2008079891 7/2008

OTHER PUBLICATIONS

U.S. Court of Appeals for Federal Circuit, Federal Circuit Rule 36 Per Curiam Judgment Affirming District Court Decision of Invalidity of U.S. Pat. No. 9,671,955 under 35 U.S.C. 101, Case No. 2002-1327, Oct. 19, 2020.
(Continued)

*Primary Examiner* — William D Titcomb
(74) *Attorney, Agent, or Firm* — David A. Giordano

(57) ABSTRACT

In embodiments of the present invention, a virtual phone is provided which includes a touch screen mounted on an enclosure that includes a processor, memory, wireless communication port, and a power port. The virtual phone further includes a software application executing on the processor to control image display on the touch screen and emulate features of a handheld device presented in the image in response to a user touching a presented feature. The virtual phone further includes a configuration of a user-specific handheld device that is derived from the user-specific handheld device is stored in a memory that is accessible to the processor; wherein the virtual phone presents a visual representation of the user-specific handheld device on the touch screen based on the configuration.

9 Claims, 7 Drawing Sheets

Related U.S. Application Data continuation of application No. 15/609,276, filed on May 31, 2017, now Pat. No. 10,394,447, which is a continuation of application No. 14/088,361, filed on Nov. 23, 2013, now Pat. No. 9,671,955, which is a continuation of application No. 13/087,426, filed on Apr. 15, 2011, now abandoned.

(60) Provisional application No. 61/324,614, filed on Apr. 15, 2010.

(51) Int. Cl.
*H04M 1/60* (2006.01)
*H04M 1/72409* (2021.01)
*H04M 1/72412* (2021.01)

(58) Field of Classification Search
USPC .......................................................... 715/771
See application file for complete search history.

(56) References Cited

U.S. PATENT DOCUMENTS

| | | | |
|---|---|---|---|
| 7,685,527 | B2 | 3/2010 | Yan et al. |
| 8,078,397 | B1 | 12/2011 | Zilka |
| 8,326,259 | B2 | 12/2012 | Gautama |
| 8,760,414 | B2 | 6/2014 | Kim |
| 8,904,308 | B2 | 12/2014 | Kramer et al. |
| 9,346,365 | B1 | 5/2016 | Penilla |
| 10,976,926 | B2 * | 4/2021 | Kildevaeld ............ G06F 3/0488 |
| 2002/0005802 | A1 | 1/2002 | Bryant |
| 2004/0203850 | A1 | 10/2004 | Oesterling |
| 2004/0217988 | A1 | 11/2004 | Bear et al. |
| 2005/0159881 | A1 | 7/2005 | Furukawa |
| 2006/0262103 | A1 | 11/2006 | Hu et al. |
| 2007/0118286 | A1 | 5/2007 | Wang |
| 2007/0152877 | A1 | 7/2007 | Madhaven |
| 2007/0197261 | A1 | 8/2007 | Humbel |
| 2008/0057868 | A1 | 3/2008 | Chang |
| 2008/0057929 | A1 | 3/2008 | Min |
| 2008/0065293 | A1 | 3/2008 | Placke |
| 2008/0091717 | A1 | 4/2008 | Garbow |
| 2008/0246586 | A1 | 10/2008 | Hiramine |
| 2008/0294521 | A1 | 11/2008 | Rozman |
| 2009/0079705 | A1 | 3/2009 | Sizelove |
| 2009/0195513 | A1 | 8/2009 | Dybalski et al. |
| 2010/0214267 | A1 | 8/2010 | Radivojevic et al. |
| 2010/0228404 | A1 | 9/2010 | Link, II |
| 2010/0235891 | A1 | 9/2010 | Oglesbee |
| 2010/0262929 | A1 | 10/2010 | Avery |
| 2010/0304730 | A1 | 12/2010 | Huang |
| 2011/0022977 | A1 | 1/2011 | Eldering |
| 2011/0029185 | A1 | 2/2011 | Aoki |
| 2011/0060994 | A1 | 3/2011 | Maxwell |
| 2011/0093846 | A1 | 4/2011 | Moinzadeh |
| 2011/0143726 | A1 | 6/2011 | de Silva |
| 2011/0143750 | A1 | 6/2011 | Farrell |
| 2011/0199389 | A1 | 8/2011 | Lu et al. |
| 2011/0224870 | A1 | 9/2011 | Tan |
| 2011/0244841 | A1 | 10/2011 | Locker |
| 2012/0077586 | A1 | 3/2012 | Pishevar |
| 2012/0079080 | A1 | 3/2012 | Pishevar |
| 2012/0079265 | A1 | 3/2012 | Ferren |
| 2012/0113141 | A1 | 5/2012 | Zimmerman et al. |
| 2012/0173732 | A1 | 7/2012 | Sullivan |
| 2017/0269831 | A1 * | 9/2017 | Kildevaeld ............ G06F 3/0488 |

OTHER PUBLICATIONS

Declaration of Christopher K. Wilson, Support of Petition for Inter Partes Review of U.S. Pat. No. 9,671,955, IPR2019-01536, EX 1002 IPR2019-01536, U.S. Pat. No. 9,671,955.
Microsoft Computer Dictionary (2002), 5th Edition, Microsoft Press, Redmond, Washington, EX 1010 IPR2019-01536, U.S. Pat. No. 9,671,955.
Motorola PCS (n.d.). Motomanual E815 CDMA, Motorola.com, retrieved from: www.manualslib.com, EX 1011 IPR2019-01536, U.S. Pat. No. 9,671,955.
Palm, Inc. (2005). Palm TX Handheld User Guide, EX 1012 IPR2019-01536, U.S. Pat. No. 9,671,955.
Research In Motion (2004). BlackBerry 7290 Wireless Handheld User Guide, EX 1013 IPR2019-01536, U.S. Pat. No. 9,671,955.
Apple, Inc. (2019) Introducing Phone 3GS. Retrieved on Aug. 7, 2019 from https://web.archive.org/web/20100324151710/http://www.apple.com/iphone/iphone-3gs/, EX 1014 IPR2019-01536, U.S. Pat. No. 9,671,955.
Apple, Inc. (2019). High Technology. Retrieved on Aug. 7, 2019 from https://web.archive.org/web/20100324151710/http://www.apple.com/iphone/iphone-3gs/high-technology.html, EX 1015 IPR2019-01536, U.S. Pat. No. 9,671,955.
Apple, Inc. (2019). Specifications for iPhone3gs. Retrieved from https://web.archive.org/web/20100331021338/www.apple.com/iphone/specs.html, EX 1016 IPR2019-01536, U.S. Pat. No. 9,671,955.
Research In Motion (2019). Specifications for BlackBerry 7290. Retrieved from https://www.gsmarena.com/blackberry_7290-1348.php, EX 1017 IPR2019-01536, U.S. Pat. No. 9,671,955.
Yamar Electronics Ltd. (2019). UART LIN CAN protocols over DC Power Lines Communication. Retrieved from https://yamar.com, EX 1018 IPR2019-01536, U.S. Pat No. 9,671,955.
Apple, Inc. iPod Features Guide, EX 1020 IPR2019-01536, U.S. Pat. No. 9,671,955.
Research in Motion, Inc. (2019). BlackBerry 7290 Official Photos. Retreived from https://www.gsmarena.com/blackberry_7290-pictures-1348.php, EX 1021 IPR2019-01536, U.S. Pat. No. 9,671,955.
Apple-History.com (2019). iPod (with video). Retrieved from https://apple-history.com/ipod_video, EX 1022 IPR2019-01536, U.S. Pat. No 9,671,955.
Phone Scoop (2019). Motorola E815/E816 Hollywood. Retrieved from https://www.phonescoop.com/phones/phone.php?p=663, EX 1023 IPR2019-01536, U.S. Pat. No. 9,671,955.
Palm Infocenter. Palm TX Handheld Review. Retrieved from www.palminfocenter.com/news/8140/palm-tx-handheldreview/, EX 1024 IPR2019-01536, U.S. Pat. No. 9,671,955.
Cohen, M; Michaels, P. (2019). Apple Turns In Record-Setting Third Quarter Sales, Profits. Macworld. Retrieved from https://www.macword.com/artce/1141829/appeq309.htm, EX 1026 IPR2019-01536, U.S. Pat. No. 9,671,955.
Bhatnagar, B (2011). iPhone 3GS Sells Faster Than New Android Phones. Retrieved from https://www.iphonefaq.org/archives/971362, EX 1027 IPR2019-01536, U.S. Pat. No. 9,671,955.
Apple, Inc. (2009). Apple Sells Oer One Million iPhone 3GS Models. Retrieved from www.apple.com/newsroom/2009/06/22Apple-Sells-Over-One-Million-iPhone-3GS-Models/, EX 1028 IPR2019-01536, U.S. Pat. No. 9,671,955.
Memorandum and Order On Motion to Dismiss. Nov. 27, 2019. *KCG Technologies v. Carmax Auto Superstores, Inc. et al.* U.S.D.C. for Massachusetts, Civil No. 19-11101-LTS.
Second Declaration of Christopher Wilson. IPR2019-01536 for U.S. Pat. No. 9,671,955. US Patent and Appeal Board, USPTO, EX 1034 IPR2019-01536, U.S. Pat No 9,671,955.

* cited by examiner

VIRTUAL SMART PHONE

CROSS-REFERENCE TO RELATED APPLICATIONS

This application is a continuation of U.S. application Ser. No. 16/513,526, filed Jul. 16, 2019, which was a continuation of U.S. application Ser. No. 15/609,276, filed May 31, 2017, now U.S. Pat. No. 10,394,447, which was a continuation of U.S. application Ser. No. 14/088,361, filed Nov. 23, 2013, now U.S. Pat. No. 9,671,955, which was a continuation of U.S. application Ser. No. 13/087,426, filed Apr. 15, 2011, which claims the benefit of provisional App. No. 61/324,614, filed Apr. 15, 2010. Those applications are hereby incorporated by reference in their entireties.

BACKGROUND OF THE INVENTION

Field

The invention is related to accessing features, functions, customizations, data plans, service provider, applications, or user interface characteristics of a handheld device for display on a touch screen that is independent of the handheld device.

Description of the Related Art

Mobile smart phones offer a variety of user interfaces, data plans, network services, and the like that are accessible through the smart phone. These features are generally only available through the smart phone device, yet much of the data is backed-up on servers and accessible to be managed by the user through a web browser internet-connected terminal/computer. However, without the smart phone physical device, the benefits of these capabilities are not available to the user.

Situations such as operating a vehicle may make use of most smart phones dangerous and handheld device use is illegal while driving in some jurisdictions. Therefore, users must rely in intermediate devices such as a Bluetooth headset or in-vehicle system that do not provide the full complement of features, including the look and feel of the smart phone to perform a subset of the smart phone functions, while requiring the user to keep the smart phone in proximity while operating the vehicle. Similarly users often become familiar with operation of a smart phone, yet need to learn several other types of electronic device interfaces to conduct daily business, make phone calls, access the internet, and the like. Therefore, users experience unnecessary complication and inefficiency in interacting with these various interfaces when almost all of the capabilities required for daily access to the internet and electronic media are embodied in the smart phone user interface and features.

SUMMARY OF THE INVENTION

In an aspect of the virtual smart phone methods and systems described herein, a virtual smart phone is provided. The virtual smart phone includes a touch screen, a software application, and a configuration of a user-specific handheld device that is separate from the virtual smart phone. The touch screen may be mounted on an enclosure. The enclosure may include a processor, memory, wireless communication port, and a power port. In an embodiment, the touch screen may be a resistive touch screen, a capacitive touch screen, a surface acoustic wave touch screen, and the like. Further, the software application may be executed on the processor to control image display on the touch screen. The software application may further emulate features of a handheld device presented in the image in response to a user touching a presented feature. In an embodiment, the features of the handheld device may include volume controls, messages, e-mails, internet browser, radio, music player, calendar, games, timer, Global Positioning System (GPS), contacts, applications, clock, maps, camera, and the like. More generally, the emulated features may include elements for controlling a handheld device or elements for interacting with applications, of many types, that may be executed on a handheld device.

Further, a configuration for the virtual smart phone may be derived from the separate user-specific handheld device. Such configuration may be stored in a memory that may be accessible to the processor. The configuration of the user-specific handheld device may include configuration data for a calendar, notes, emails, text messages, voice messages, multimedia messages, media files, applications, wireless network service plan, contact lists, bookmarks, settings for browsers, network, chat messengers, and the like. In addition, the virtual smart phone may provide a visual representation of the user-specific handheld device on the touch screen based on the configuration. In an embodiment, the user specific handheld device may be a smart phone, a Personal Digital Assistant (PDA), a mobile phone, an iPad, a computer note book, and the like.

In another aspect of the virtual smart phone methods and systems described herein, a method for accessing a handheld device by interacting with a projected image is provided. The method includes projecting an image of a handheld device on a projection screen. The handheld device may be communicatively coupled to the projection screen. The method may further include accessing the handheld device by interacting with the projected image, wherein the projected image emulates features of the handheld device.

In another aspect of the present virtual smart phone methods and systems described herein, a method may include accessing configuration data associated with a handheld device. The method may further include emulating functions and features of the handheld device based on the accessed configuration data.

In yet another aspect of the virtual smart phone methods and systems described herein, a method of emulating a smart phone may include receiving information over a network indicative of a smart phone user interface, including physical features thereof; receiving information over a network indicative of user-specific data associated with the smart phone; displaying an image representative of the smart phone including actionable elements based on the user-specific data; and facilitating, with a processor, access to at least one feature of the smart phone in response to a user interacting with at least one of the actionable elements. Access to at least one feature of the smart phone ma include accessing the at least one feature on the smart phone. Alternatively, access to at least one feature of the smart phone may include accessing the at least one feature without requiring access to the smart phone.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood with reference to the following figures.

DETAILED DESCRIPTION OF THE PREFERRED EMBODIMENT(S)

Detailed embodiments of the present invention are disclosed herein; however, it is to be understood that the disclosed embodiments are merely pedagogical and does not limit other embodiments in various forms and with various functions. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather to provide an understandable description of the invention.

The terms "a" or "an," as used herein, are defined as meaning one or more than one. The term "another," as used herein, is defined as at least a second or more. The terms "including" and/or "having", as used herein, are defined as comprising (i.e., open transition). The term "coupled" or "operatively coupled," as used herein, is defined as at least temporarily connected, although not necessarily directly and/or mechanically.

Figure 1:
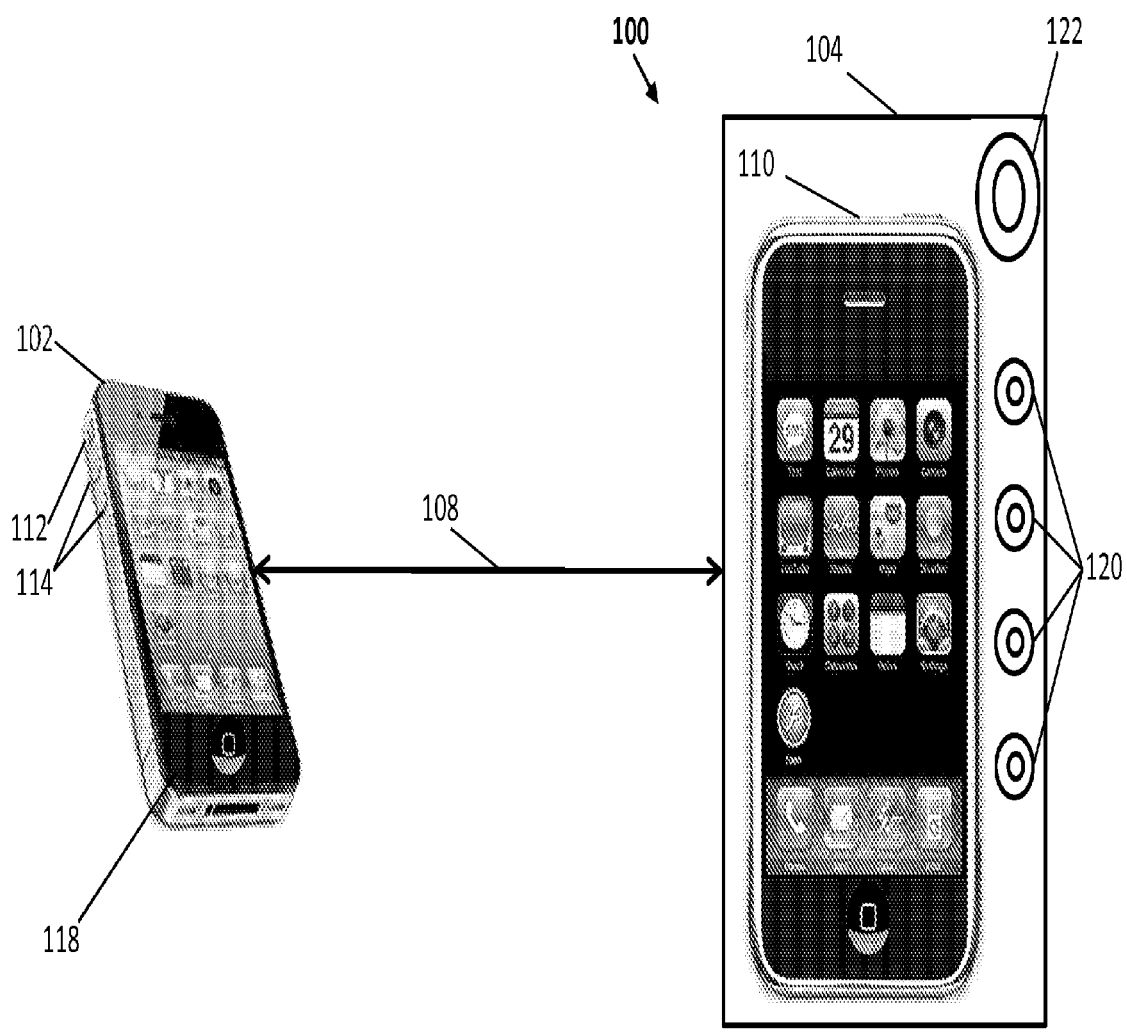
FIG. 1 depicts a block diagram of a smart phone in communication with a system that facilitates accessing the features, functions, resources and the like of the smart phone through an image of the smart phone that is projected on a touch screen.

FIG. 1 depicts a block diagram of a smart phone in communication with a system that facilitates accessing the features, functions, resources and the like of the smart phone through an image of the smart phone that is projected on a touch screen. Accessing any or all features of a handheld device may be accomplished by interacting with a touch screen that displays an image of the handheld device. The virtual smart phone 100 may facilitate accessing a handheld device 102 through a communication means 108 (such as a computer network, the internet, Bluetooth, WiFi, WiMax, LTE, and the like). In embodiments, the handheld device 102 may be, without limitations, a smart phone, a Personal Digital Assistant (PDA), a mobile phone, an IPAD, a computer note book, and the like. Further in embodiments, the virtual smart phone 100 may include a touch screen 104 that may be, without any limitation, a touch screen, or/and any screen known in the art that may be controlled with a remote control, speech, mouse, touch pad, track ball, and the like. The screen 104 may preferably be a touch screen. Communication means 108 may be a wireless or a wired communication technology standard. The virtual smart phone 100 may further include displaying an image 110 of the handheld device 102 on the screen 104. The screen 104 may also include a plurality of physical buttons 120 that may emulate functionalities of physical buttons present on the handheld device 102. In an exemplary embodiment, the handheld device 102 may include physical buttons 112, 114, and 118. The physical buttons 112, 114, and 118 may have functionalities like, without any limitation, volume up/down, ring/silent, home button, power On/Off, sleep mode/wake mode, and speed dialing. The screen 104 also includes an interface 122 to facilitate speech/voice command controlling of the screen 104. In an example, the interface 122 may be a microphone.

Figure 2:
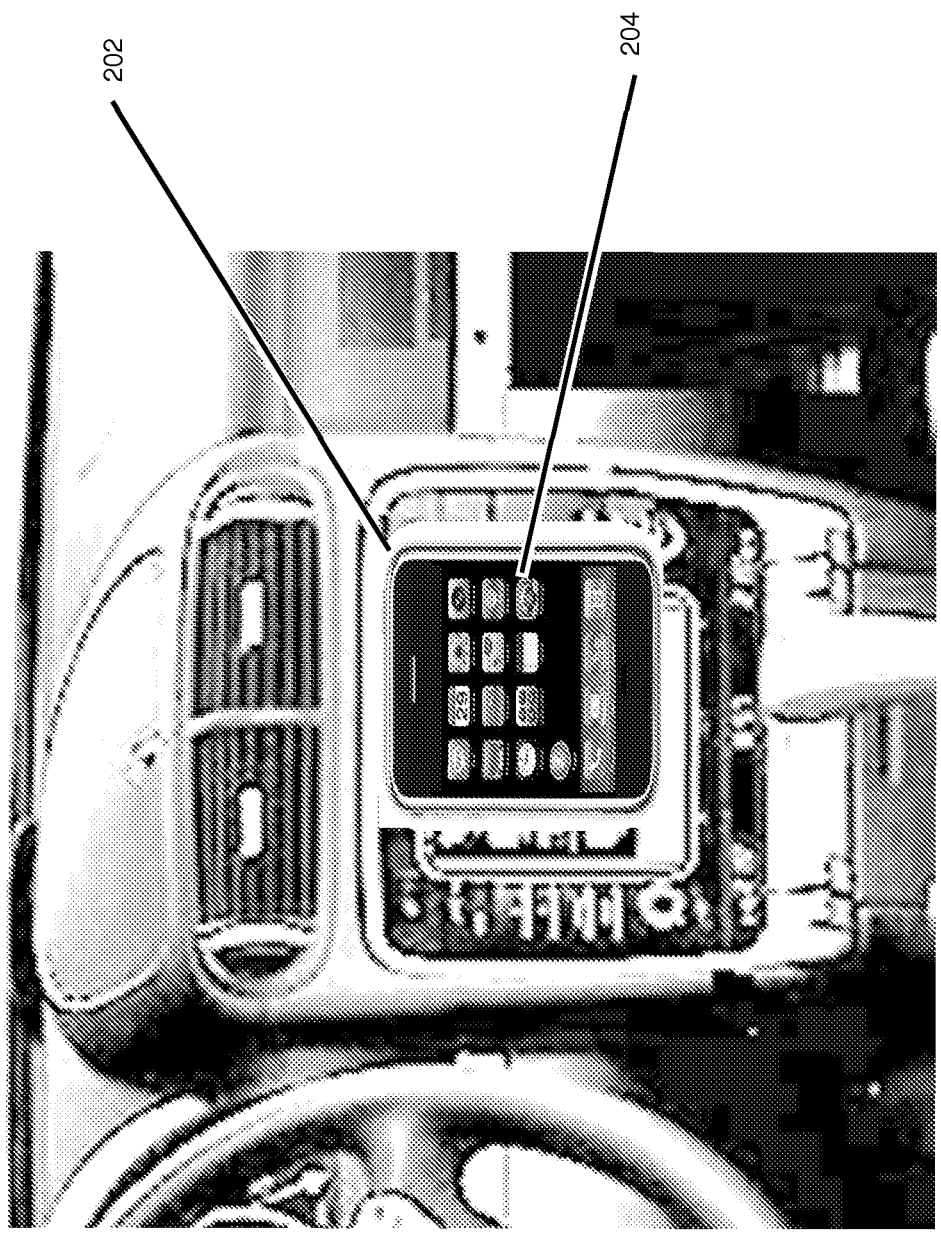
FIG. 2 depicts a front view of an exemplary automotive embodiment of the system depicted in FIG. 1.

FIG. 2 illustrates an exemplary embodiment of the system 100 described in FIG. 1. FIG. 2 depicts a vehicular deployment 200 of the virtual smart phone 100 that includes automotive touch screen 202. Further, the automotive touch screen 202 includes an image 204 of a handheld device user interface, and may include a physical representation of the handheld device including touchable elements (e.g. touch-screen, icons, physical buttons, keys, and the like). The handheld device may be as described in conjunction with FIG. 1 or may be any other type of separate handheld device. The handheld device and the automotive touch screen 202 may be communicatively coupled via a wireless network and/or wired network as needed for allowing the user to access the features, functions, applications, resources, services, and capabilities of the separate handheld device through the vehicular-deployed virtual smart phone 100.

Further in embodiments, the automotive touch screen 202 in the vehicle may be configured into the automobile, without any limitation, on a stereo system, dashboard, glove box, console, headrest, rear-view mirror, steering wheel, and the like. In other embodiments, the automotive touch screen 202 may be detachable and may be placed anywhere, such as within the vehicle. In the embodiment when the automotive touch screen 202 is detachable, the automotive touch screen 202 may be placed in a holder and may be attached to the windshield of the vehicle. The automotive touch screen 202 may also be placed in a docking station and may be attached to the windshield of the vehicle or placed near the stereo system. Further, the automotive touch screen 202 may have a compact and light weight housing that may withstand vehicle generated vibrations and may provide stable viewing platforms. The housing may be flexible to rotate sideways and bend.

The term vehicle herein may refer to any type of human conveyance (e.g. automobile, truck, taxi, coach, train, carriage, airplane, boat, ship, submarine, bicycle, motorcycle, and the like) that may be motorized, manually operated, animal powered, autonomously operated, and the like. In an alternative embodiment, the virtual smart phone may be handheld, and or installed either permanently or otherwise in any housing, structure, or other physical element (e.g. a portion of a building (e.g wall, floor, ceiling, window, door), a piece of furniture, monument, kiosk, computer, and the like). The intent herein is to allow the virtual smart phone 100 to be configured to be used alone or in a physically cooperative relationship with another object.

In an example, when the automotive touch screen 202 is inbuilt on a stereo system of the vehicle and is coupled to the handheld device, a button, such as one of the stereo system buttons that may be accessible outside the border of automotive touch screen 202 may be used to activate the virtual smart phone 100 functionality on the automotive touch screen 202. The image 204 of the handheld device may emulate substantially all of the features of the separate handheld device that are available through the various aspects of the user interface of the handheld device. The various features of the handheld device that may be emulated may include, without any limitation, control features, application features, or the like, such as volume controls, messages, e-mails, Internet browser, radio, music player, calendar, games, timer, Global Positioning System (GPS), contacts, applications, clock, maps, and camera. In an embodiment, the automotive touch screen 202 may have physical buttons to emulate the functionality of the physical buttons that are present on the handheld device as is shown in the embodiment of FIG. 1. In examples, the emulated physical buttons may have the functionality of volume control, power on/off, home button, power ON/OFF, sleep mode/wake mode ring/silent, speed dialing, and the like. The automotive touch screen 202 may also have a port for connecting a power cord to provide power to the automotive touch screen 202. In an example, the automotive touch screen 202 may receive power from the vehicle's battery.

Further, the automotive touch screen 202 or other touch screen as described herein may facilitate access of any of the features, services, functionality, data storage, and the like of the handheld device by facilitating a user interacting with the image 204. In an example, the automotive touch screen 202 may be a touch sensitive screen and may allow interactions based on the touch of a user. In embodiments, the touch sensitive screen may be one of the following: a resistive touch screen, capacitive touch screen, surface acoustic wave touch screen, and the like. In another example, the automotive touch screen 202 may be any known in the art screen and may be controlled by direct or indirect touching, a remote control, speech, a mouse, a touch pad, a track ball, and the like. In an embodiment, the virtual smart phone 100 may include a client application that may allow the automotive touch screen 202 to act as a remote control for the handheld device. The client application may detect various interactions of the user with the image 204 including, without any limitation, touch of a finger, location of the mouse cursor, and rolling, pushing or tapping of the touch pad or track ball and based on the interaction may trigger the corresponding function/control of the handheld device. The trigger from the image 204 on the automotive touch screen 202 may be communicated to the handheld device via a wireless or wired network that may be a direct connection between the separate handheld device and the virtual smart phone 100 or may be an indirect connection through one or more networks, such as a cellular network and/or the Internet. Thus, the user may operate the handheld device by interacting with the virtual smart phone 100 image 204 just as if the user were interacting with the handheld device. It will be apparent to a person ordinarily skilled in the art that the handheld device may or may not require a similar client application to communicate with the automotive touch screen 202 and allow seamless access to the user. The client application may further dynamically and/or automatically adjust visual dimensions of the image 204 to present the applications and functions of the handheld device on the automotive touch screen 202.

Figure 3:
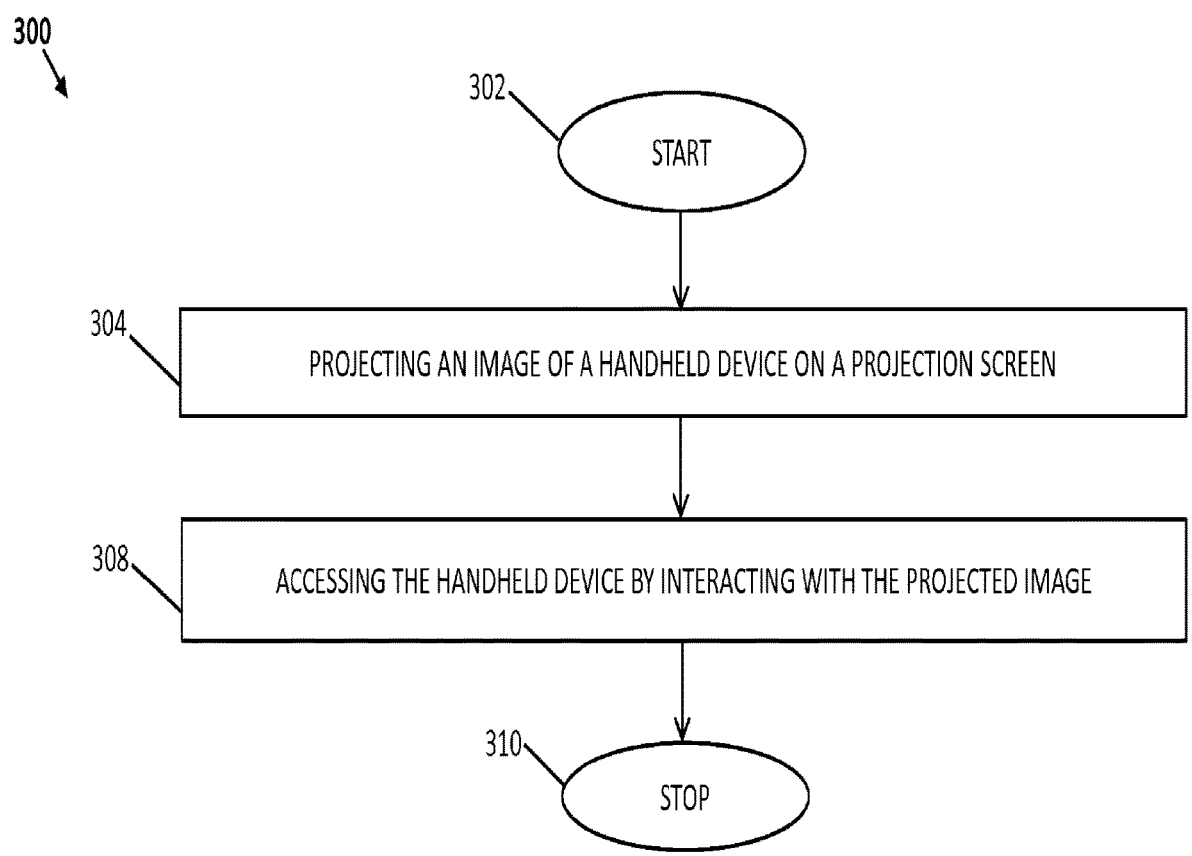
FIG. 3 depicts a diagram of a simplified flow of a method for use of the system of FIG. 1 or 2.

FIG. 3 depicts a method for accessing features, functions, resources, user data, calling or data plans, and the like of a handheld device by interacting with a virtual smart phone 100, in accordance with an embodiment of the invention. The method starts at step 302. At step 304, an image of the handheld device may be displayed on a touch screen. The handheld device may be communicatively coupled to the touch screen through one or more wireless or wired networks. Thereafter, at step 308, the handheld device may be accessed by interacting through a touch screen with the displayed image of the handheld device. The touch screen may capture user input using any of a wide variety of techniques known to those of ordinary skill in the art, then storing the input for either local processing or forwarding it to another processor (or both), such as a server, or to a processor of the separate handheld device that is being emulated. The image may emulate the features and functions of the handheld device and thus, may allow access to the services that are available to a user through the handheld device with the virtual smart phone 100. In various embodiments, processing of touch screen inputs and presentation of appropriate responsive displays may take place locally, or remotely, including on a separate handheld device that is being emulated, or by a central server that is used to synchronize the touch screen display with the separate handheld device. Synchronization of the touch screen and the separate handheld device for emulation purposes may take place on a real-time, command-by-command basis (such as by streaming command packets, with appropriate transformation to accommodate the operating system and data protocols of the respective devices), or by periodic batch updates (with local processing at the touch screen between updates), using techniques widely understood for synchronizing processors, memory elements, applications, or the like.

Figure 4:
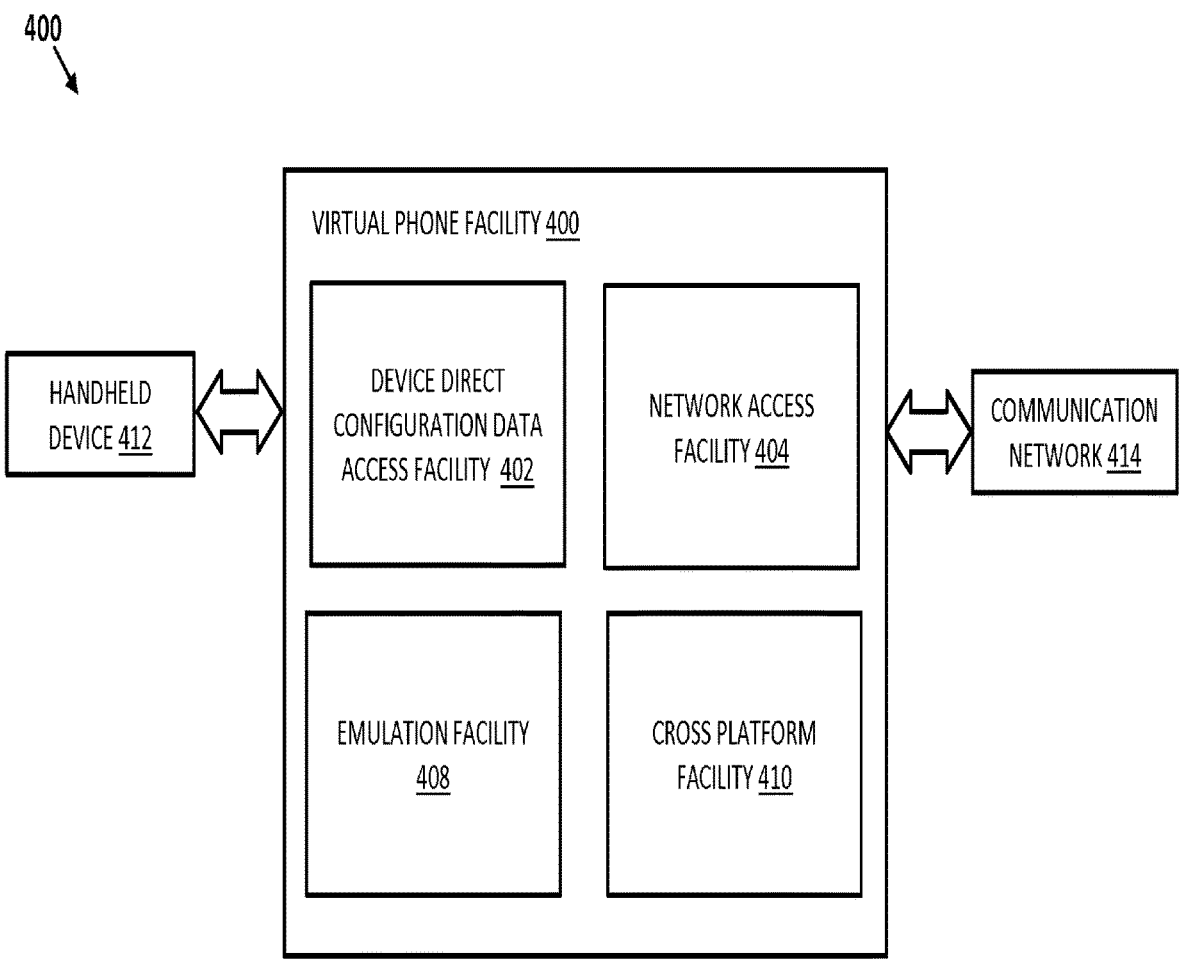
FIG. 4 depicts a block diagram of a virtual smart phone facility comprising a software application in communication with a smart phone device and in communication with a communication network.

FIG. 4 depicts the virtual smart phone 100 embodied as a software application 400 that may be executed on any computing facility that may also support user interaction through a touch screen. Hereinafter, the software application 400 will be interchangeably referred to as virtual smart phone application 400. As depicted in the FIG. 4, the virtual smart phone application 400 may include a device direct configuration data access facility 402, a network access facility 404, an emulation facility 408, and a cross platform facility 410. The four facilities 402, 404, 408, and 410 may be in communication with each other as well as in communication with other facilities not specified herein in detail (e.g. a power facility, a radio facility, a data storage facility, and the like). Further, the virtual smart phone application 400 may interact with a separate handheld device 412, including smart phones, PDAs, mobile phones, iPads, computer note books, and the like. Generally a touch screen handheld device is contemplated, but any handheld device may be emulated with the virtual smart phone facility 100. The virtual smart phone application 400 may also interact with communication networks 414, including Internet, Long Term Evolution (LTE), $4^{th}$ Generation (4G), $3^{rd}$ Generation (3G) cellular networks, and the like. The device direct configuration data access facility 402 may allow the virtual smart phone application 400 to access and synchronize configuration data associated with the handheld device 412. The configuration data associated with the handheld device 412 may include, without any limitation, calendars, notes, emails, text messages, voice messages, multimedia messages, media files, applications, wireless network service plan, contact lists, bookmarks, settings for browsers, network, chat messengers, and the like. The network access facility 404 may allow the virtual smart phone application 400 to interact with a web server over different types of communication networks, and synchronize and access the configuration data by sending and receiving configuration data of the handheld device 412 to the web server. The network access facility 404 may facilitate network and communication functions like accessing applications, making phone calls (in which case the touch screen may be associated with a speaker and microphone or similar facilities for enabling voice communication), sending messages, and the like. The emulation facility 408 may facilitate emulating all features, functions, user interface, applications, customizations, and look-and-feel of the handheld device 412. The cross platform facility 410 may allow the virtual smart phone application 400 to support emulation of and execute on different types of devices operating on different platforms including, without any limitation, Nokia's Symbian, Google's Android, Apple's iOS, RIM'S BlackBerry OS, Microsoft's Windows Phone, Linux, Palm/HP's WebOS, Samsung's Bada, Nokia's Maemo, and MeeGo. In embodiments the virtual smart phone or other embodiments described herein may be adapted to accept configuration information from more than one separate handheld device, including separate handheld devices that use different operating systems.

Figure 5:
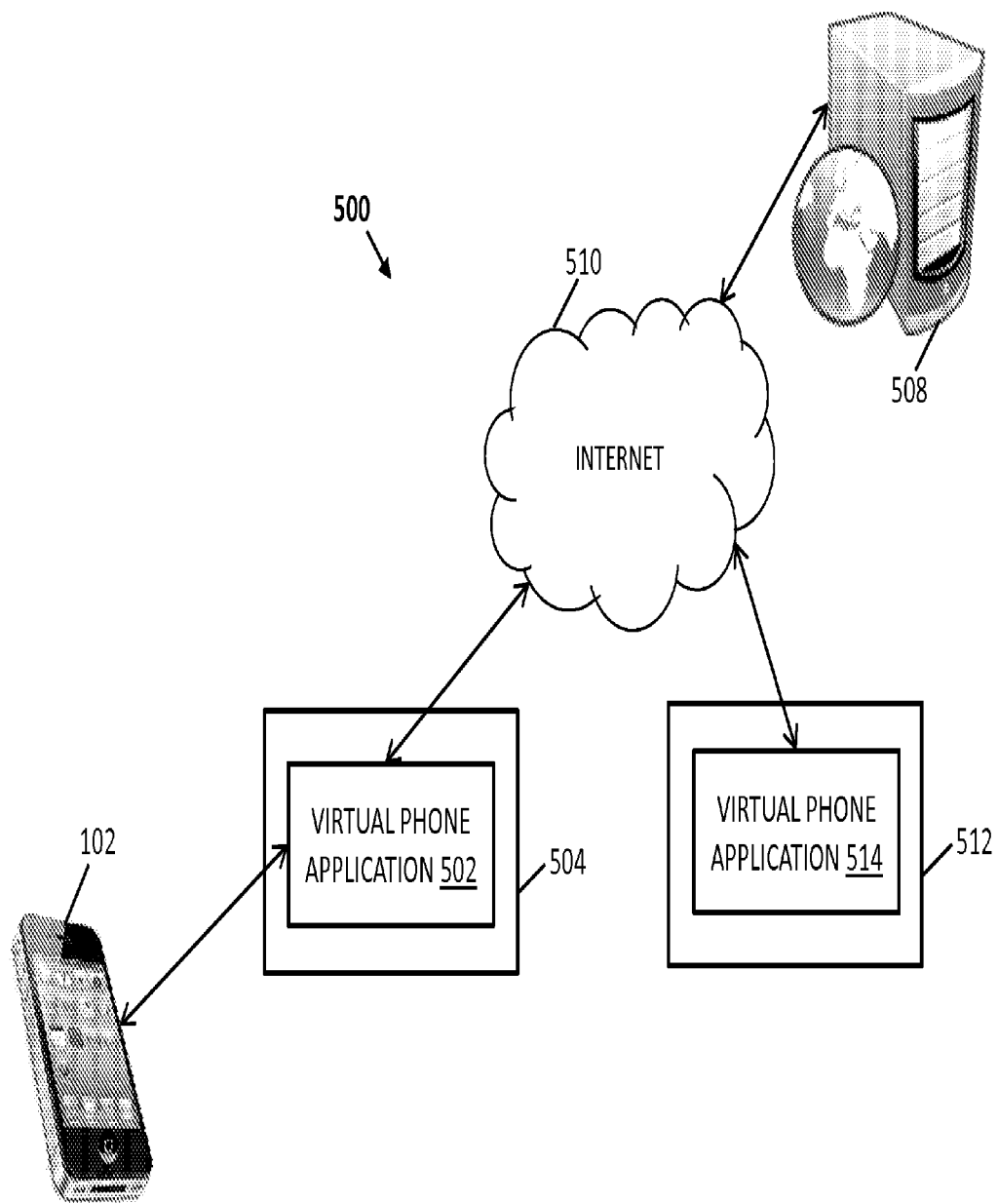
FIGS. 5 and 6 depict block diagrams of network-based embodiments of a virtual smart phone facility that includes communication services for interacting with a smart phone device, a network, a network server, and other virtual smart phone facilities.
Figure 6:
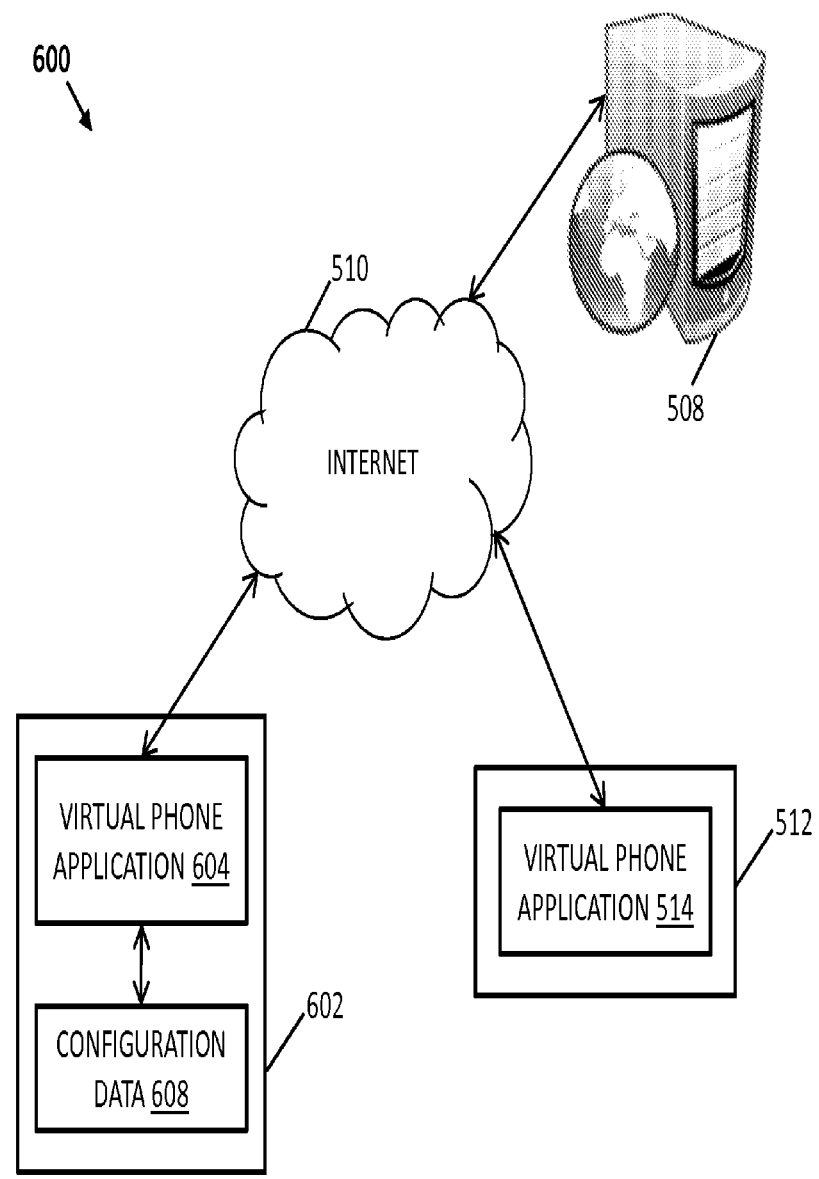

FIGS. 5 and 6 depict network-based embodiments of the virtual smart phone facility 100 wherein a virtual smart phone application synchronizes configuration data of a separate handheld device by interacting with a web server. FIG. 5 depicts the handheld device 102 in communication with a virtual smart phone application 502 running on a touch screen computing device 504. In embodiments, the touch screen computing device 504 may be, without any limitation, a smart phone, a PDA, a mobile phone, an IPAD, a computer note book, and inbuilt screen in a vehicle. In an embodiment, the virtual smart phone application 502 may access the configuration data of the handheld device 102 and may upload the configuration data to a web server 508 via a communication network 510. In an example, the communication network 510 may be the Internet. In an embodiment, while the configuration data is being uploaded, a user of the handheld device 102 may secure the future access of the configuration data. In an example, the configuration data may be secured using a username and a password. Further, the web server 508 may store the configuration data associated with the handheld device 102 in a secure manner and may allow access to the configuration data upon receiving the correct username and password set by the user of the handheld device 102.

Further, there may be cases when the user of handheld device 102 is not willing or available to access his/her handheld device 102 and may ask another user to access his/her handheld device 102 or may have lost or forgotten his/her handheld device 102 and needs to access the features, functions, applications, services, data, and the like of his/her handheld device. In such cases, the user may use a touch screen computing device having a virtual smart phone application installed on it in lieu of having access to his/her handheld device. FIG. 5 further depicts a touch screen computing device 512 having a virtual smart phone application 514. In an embodiment, the touch screen computing device 512 may access the configuration data of the handheld device 102 using the virtual smart phone application 514 and may function like the handheld device 102. A user of the touch screen computing device 512 may use the virtual smart phone application 514 to access the configuration data associated with the handheld device 102 from the web server 508 via the communication network 510. The configuration data may be accessed by providing the same username and password that was used while uploading the configuration data to the web server 508. Once the configuration data of the handheld device 102 is available, the virtual smart phone application 514 may allow access of to the same features, functions, applications, data, services and the like of the handheld device 102 by displaying its image on the touch screen of the computing device 512. The displayed image may emulate all the features, functions, applications and the like of the handheld device 102 and may provide an exact look-and-feel of the handheld device 102.

Referring now to FIG. 6 that depicts a handheld device 602 having a virtual smart phone application 604. The virtual application 604 may access the configuration data 608 associated with the handheld device 602 and may upload the configuration data to a web server 508 via the communication network 510. In an embodiment, while the configuration data is being uploaded, a user of the handheld device 602 may secure the future access of the configuration data. In an example, the configuration data may be secured using a username and a password. Further, the web server 508 may store the configuration data in a secure manner and may allow access to the configuration data upon receiving the correct username and password set by the user of the handheld device 602. In an embodiment, when physical access of handheld device 602 is not possible, the features and functionalities of the handheld device 602 may be accessed through the touch screen computing device 512 as discussed in conjunction with FIG. 5.

Figure 7:
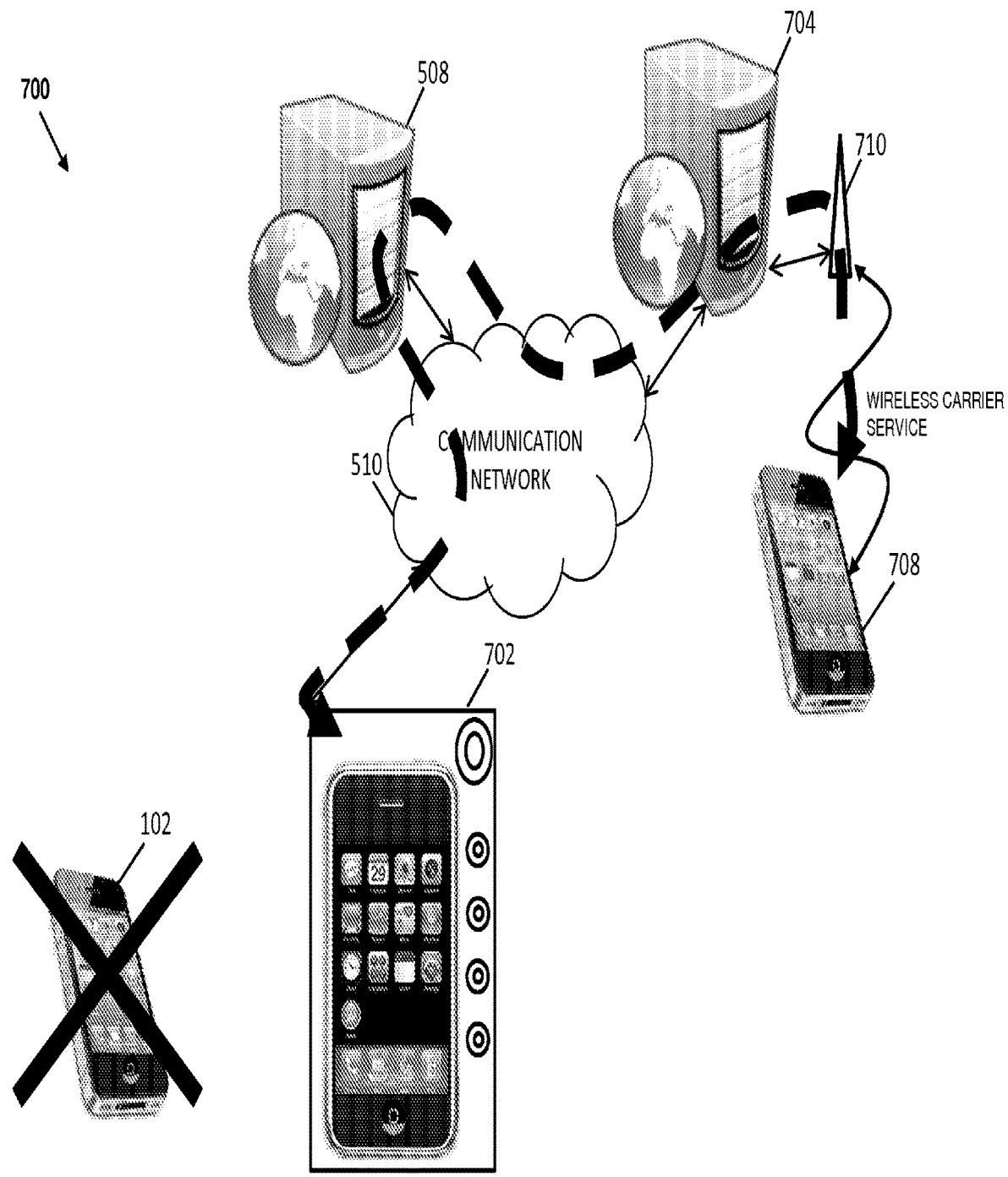
FIG. 7 depicts a schematic diagram of a virtual smart phone establishing a call based on the functions, features, resources, and configuration of an unavailable smart phone.

FIG. 7 depicts an embodiment 700 wherein a virtual smart phone facility establishes a call based on accessed configuration data of a handheld device 102 independent of if the handheld device 102 is disabled. FIG. 7 depicts a disabled handheld device 102, a virtual smart phone 702, the communication network 510, the web server 508, a gateway 704, a cell tower 710, and a called party handheld device 708. The user of the handheld device 102 may access the configuration data associated with the handheld device 102 and may configure the virtual smart phone 702 to act like the handheld device 102. It will be apparent to a person ordinarily skilled in the art that the virtual smart phone 702 may be a virtual smart phone application that may execute on a computing device (similar to the touch screen computing device 504). Based on the configuration data, the virtual smart phone 702 may identify the wireless carrier for the handheld device 102, the wireless service plan, type of wireless network, and the like. In an embodiment, the wireless network may be, without any limitation, LTE, 4G, 3G, and the like. Based on this identification, the virtual smart phone 702 may request the web server 508 to connect to the gateway for the identified wireless carrier so as to establish the call with the handheld device 708. On receiving the request, the web server 508 may forward the call request to the identified gateway 704. The gateway 704 upon receiving the call request may search for a cell tower serving the handheld device 708 (on the identified wireless carrier network or another wireless carrier network based on the wireless network serving the handheld device 708). After the gateway 704 has identified the cell tower, the handheld device 708 may be located and the call may be established. In this way the user has full access to the capabilities and features of his/her smart phone through the virtual smart phone system even though the user's smart phone handheld device may not even be turned on.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon.

Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A computing device configured to be installed in an automobile comprising:
 a touch screen;
 one or more processors;
 a non-transitory memory;
 one or more programs configured to allow the computing device to wirelessly interact with a smart phone, wherein the one or more programs are stored in the memory and configured to be executed by the one or more processors, the one or more programs comprising:
- a device direct configuration data access facility configured to allow the computing device to receive one or more configuration data of the smart phone, wherein the one or more configuration data comprises data from a calendar, text messages, voice messages, and a contact list;
- a network access facility configured to allow the computing device to wirelessly communicate with the smart phone;
- an emulation facility configured to receive information representative of a plurality of applications installed on the smart phone and cause a user interface to be displayed on the touch screen, wherein the user interface comprises a visual representation of the plurality of applications; and
- a cross platform facility configured to allow the computing device to interact with smart phones having Apple software or Android software.

2. The computing device of claim 1, wherein the network access facility is configured to interact with a communications network.

3. The computing device of claim 2, wherein the communication network is selected from the group consisting of the Internet, Long Term Evolution (LTE) 4th Generation (4G) cellular network, and $3^{rd}$ Generation cellular network.

4. The computing device of claim 1, further comprising a network access facility configured to allow the mobile device to interact with a web server over a communication network.

5. The computing device of claim 4, wherein the device direct configuration data access facility is configured to synchronize the one or more configuration data of the smart phone.

6. The mobile device of claim 4, wherein the communication network is selected from the group consisting of the Internet, Long Term Evolution (LTE) 4th Generation (4G) cellular network, and $3^{rd}$ Generation cellular network.

7. The mobile device of claim 4, wherein the network access facility facilitates a communication function selected from the group consisting of accessing an application of the handheld device, making a phone call, and sending a message.

8. A method comprising:
- at a computing device configured to be installed in an automobile, the computing device comprising a touch screen, one or more processors, a non-transitory memory, and one or more programs;
- wireless coupling to a smart phone;
- receiving configuration data from the smart phone, wherein the configuration data comprises data from a calendar, text messages, voice messages, and a contact list;
- receiving information representative of a plurality of applications installed on the smart phone;
- displaying a user interface comprising a visual emulation of the plurality of applications installed on the smart phone; and
- in response to processing a touch screen input, forwarding information indicative of the input to the smart phone.

9. The method of claim 8, further comprising synchronizing the computing device and the smart phone.

* * * * *